(12) United States Patent
Ruoff et al.

(10) Patent No.: US 11,817,231 B2
(45) Date of Patent: Nov. 14, 2023

(54) DETECTION SYSTEM FOR X-RAY INSPECTION OF AN OBJECT

(71) Applicants: Carl Zeiss SMT GmbH, Oberkochen (DE); Carl Zeiss X-ray Microscopy Inc., Dublin, CA (US)

(72) Inventors: Johannes Ruoff, Aalen (DE); Juan Atkinson Mora, Hillsboro, OR (US); Thomas Anthony Case, Walnut Creek, CA (US); Heiko Feldmann, Aalen (DE); Christoph Hilmar Graf Vom Hagen, Oakland, CA (US); Thomas Matthew Gregorich, Milpitas, CA (US); Gerhard Krampert, Pleasanton, CA (US)

(73) Assignees: Carl Zeiss SMT GmbH, Oberkochen (DE); Carl Zeiss X-ray Microscopy Inc., Dublin, CA (US)

( * ) Notice: Subject to any disclaimer, the term of this patent is extended or adjusted under 35 U.S.C. 154(b) by 0 days.

(21) Appl. No.: 17/402,822

(22) Filed: Aug. 16, 2021

(65) Prior Publication Data
US 2023/0046280 A1    Feb. 16, 2023

(51) Int. Cl.
*G21K 7/00* (2006.01)
*G01N 23/04* (2018.01)
(Continued)

(52) U.S. Cl.
CPC ............... *G21K 7/00* (2013.01); *G01N 23/04* (2013.01); *G01N 23/044* (2018.02);
(Continued)

(58) Field of Classification Search
CPC .... G01N 23/04; G01N 23/044; G01N 23/046; G01N 23/06; G01N 23/083; G01N 23/087; G01N 23/18; G21K 7/00
(Continued)

(56) References Cited

U.S. PATENT DOCUMENTS 5,012,498 A  *  4/1991  Cuzin ................... A61B 6/032
                                                    250/370.15
6,774,983 B2 *  8/2004  Kuchibhotla ....... G03F 7/70358
                                                    355/71
(Continued)

FOREIGN PATENT DOCUMENTS

DE        102018209570         12/2018

OTHER PUBLICATIONS

An English translation of DE102018209570A1 by Patent Translate. (Year: 2022).*
(Continued)

*Primary Examiner* — Allen C. Ho
(74) *Attorney, Agent, or Firm* — Fish & Richardson P.C.

(57) ABSTRACT

A detection system serves for X-ray inspection of an object. An imaging optical arrangement serves to image the object in an object plane illuminated by X-rays generated by an X-ray source. The imaging optical arrangement comprises an imaging optics to image a transfer field in a field plane into a detection field in a detection plane. A detection array is arranged at the detection field. An object mount holds the object to be imaged and is movable relative to the X-ray source via an object displacement drive along at least one lateral object displacement direction in the object plane. A shield stop with a transmissive shield stop aperture is arranged in an arrangement plane in a light path and is movable via a shield stop displacement drive in the arrangement plane. A control device has a drive control unit, which is in signal connection with the shield stop displacement drive and with the object displacement drive for synchronizing a movement of the shield stop displacement drive and the object displacement drive. The result is an optimization of an X-ray illumination of the object to achieve a high-resolution object imaging.

26 Claims, 3 Drawing Sheets

(51) Int. Cl.
*G01N 23/044* (2018.01)
*G01N 23/046* (2018.01)
*G01N 23/083* (2018.01)
*G01N 23/087* (2018.01)
*G01N 23/18* (2018.01)

(52) U.S. Cl.
CPC ......... *G01N 23/046* (2013.01); *G01N 23/083* (2013.01); *G01N 23/087* (2013.01); *G01N 23/18* (2013.01); *G01N 2223/04* (2013.01); *G01N 2223/20* (2013.01); *G01N 2223/33* (2013.01); *G01N 2223/3308* (2013.01); *G01N 2223/40* (2013.01); *G01N 2223/501* (2013.01); *G01N 2223/505* (2013.01)

(58) Field of Classification Search
USPC .................................. 378/21–27, 58, 43
See application file for complete search history.

(56) References Cited

U.S. PATENT DOCUMENTS

| | | | |
|---|---|---|---|
| 7,057,187 B1 | 6/2006 | Yun et al. | |
| 7,130,375 B1 | 10/2006 | Yun et al. | |
| 8,571,175 B2* | 10/2013 | Clemen, Jr. | G21K 1/06 378/207 |
| 8,971,483 B2* | 3/2015 | Sasaki | G01N 23/046 378/46 |
| 9,129,715 B2 | 9/2015 | Adler et al. | |
| 10,014,153 B2* | 7/2018 | Kohno | H01J 37/265 |
| 10,295,485 B2* | 5/2019 | Yun | G01N 23/087 |
| 10,324,050 B2* | 6/2019 | Hench | G01N 23/20008 |
| 10,606,048 B2 | 3/2020 | Ruoff et al. | |
| 10,692,184 B2* | 6/2020 | Ratner | G06T 3/4053 |
| 10,722,192 B2* | 7/2020 | Erler | G01N 23/046 |
| 11,009,471 B2* | 5/2021 | Muehlhauser | G01N 23/046 |
| 11,042,981 B2* | 6/2021 | Adler | G06N 20/20 |
| 11,430,118 B2* | 8/2022 | Adler | G06K 9/6267 |
| 11,615,533 B2* | 3/2023 | Adler | G06T 7/001 378/58 |
| 11,651,492 B2* | 5/2023 | Adler | H05K 3/4038 378/62 |
| 11,688,067 B2* | 6/2023 | Adler | G01T 1/20 382/128 |
| 2004/0027550 A1 | 2/2004 | Kuchibhotla | |
| 2016/0202193 A1 | 7/2016 | Hench et al. | |
| 2017/0236684 A1 | 8/2017 | Kohno | |

OTHER PUBLICATIONS

International Search Report and Written Opinion for International Application No. PCT/EP2022/070678, dated Oct. 21, 2022.

* cited by examiner

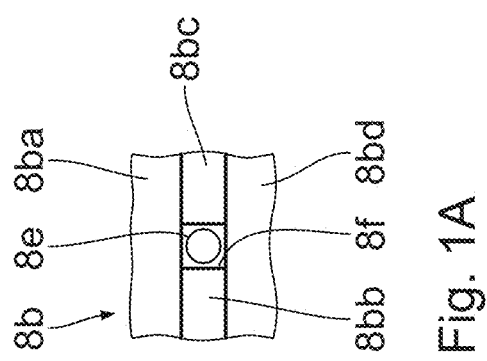
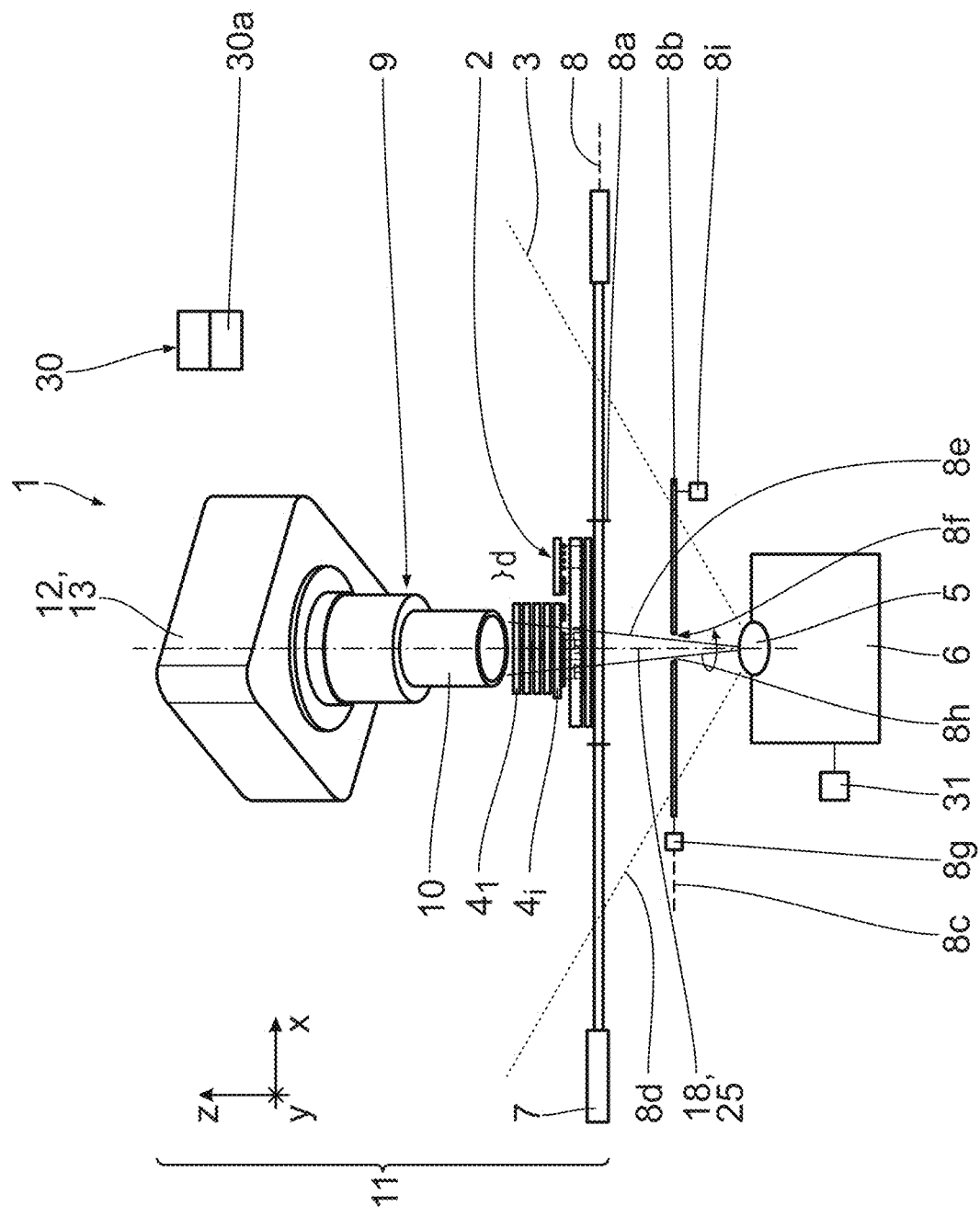

DETECTION SYSTEM FOR X-RAY INSPECTION OF AN OBJECT

TECHNICAL FIELD

The invention refers to a detection system for X-ray inspection of an object. Further, the invention refers to an X-ray inspection method using such a detection system.

BACKGROUND

A detection system for X-ray inspection of an object is known from U.S. Pat. No. 9,129,715 B2. Other such detection systems are known from U.S. Pat. No. 7,057,187 B1 and from DE 10 2018 209 570 A1.

Further, for object imaging, X-ray inspection microscopes (μCTs) and optical assisted X-ray microscopes (XRM) are known in the art. For μCTs several tomosynthesis geometries are known, wherein detectors are placed at different positions with respect to a central inspection axis. A detector and/or the sample may be moved. In that respect, it is referred to U.S. Pat. No. 7,130,375 B1 and to U.S. Pat. No. 7,057,187 B1.

SUMMARY

In a general aspect, the invention optimizes an X-Ray illumination of the object giving in particular the possibility to achieve a high-resolution object imaging.

The aspect described above is achieved by a detection system that includes an X-ray source for generating X-rays, and an imaging optical arrangement to image the object in an object plane illuminated by the X-rays, the imaging optical arrangement including an imaging optics to image a transfer field in a field plane into a detection field in a detection plane. The detection system includes a detection array, arranged at the detection field of the imaging optics, and an object mount to hold the object to be imaged via the imaging optics, in which the object mount is movable relative to the light source via an object displacement drive along at least one lateral object displacement direction in the object plane. The detection system includes a shield stop having a shield stop aperture transmissive for the X-rays used to image the object, the shield stop being arranged in an arrangement plane in a light path of the X-rays between the X-ray source and the object mount, the shield stop being movable via a shield stop displacement drive along at least one stop displacement direction in the arrangement plane. The detection system includes a control device having a drive control unit being in signal connection with the shield stop displacement drive and with the object displacement drive for synchronizing a movement of the shield stop displacement drive and the object displacement drive.

A movable shield stop gives the possibility to safeguard that only those regions of the object are illuminated with the X-rays which are imaged by the imaging optical arrangement. Uninspected optic regions, i.e. those regions of the object which actually are not imaged by the imaging optical arrangement, then are protected from unnecessary X-ray exposure. In some implementations, a synchronized movement of the shield stop displacement drive and of the object displacement drive ensures that a used light path of the X-rays to illuminate the object always (or during substantially most of the operating period of the detection system) impinges on the object at a desired object region to be imaged.

In particular, it is possible to image object structures, which are smaller than 20 μm, smaller than 10 μm and in particular which are smaller than 1 μm. Examples for such structures are Cu—Cu hybrid bonding structures between microchips and substrate conductor paths. In particular, direct bonds between single dies or between a whole wafer onto a substrate wafer can be inspected.

In particular, a 3D tomographic reconstruction of an object sample under investigation by combining several 2D images taken from different directions is possible.

X-ray energies of the used X-rays can range between 5 keV and 160 keV, preferably between 15 and 90 keV In some implementations, the object mount can be movable along at least one linear displacement direction. The shield stop is movable along at least one linear displacement direction. The object mount/shield stop movability described above have proven to be particularly advantageous to acquire a high-resolution object image. The object mount can be movable along two lateral displacement directions. Such two displacement directions can span up the object plane. The shield stop can be movable along two lateral displacement directions. Such two displacement directions can span up the shield stop arrangement plane.

In some implementations, the object mount and/or the shield stop is movable along at least one circular direction. The above-mentioned advantages also hold for movable variants in at least one circular direction as described above.

In some implementations, a shield stop having a shield stop aperture being variable in size enables an adaption of the field stop size to the requirements, which are to be met by the used X-ray path to impinge on the object region to be imaged. Such variability in size can be realized by an iris stop. The shield stop having a shield stop aperture with variable size can be equipped with an aperture variation drive. Such aperture variation drive also can be in signal connection with the drive control unit of the control device. The aperture size controlled via the aperture variation drive can depend on the positions of the shield stop displacement drive and/or of the object displacement drive.

The shield stop can include several shield blades. An embodiment of the shield stop described above can have a relatively simple structure. The shield blades can be movable relative to each other to enable a variable shield stop aperture size. The several shield blades can be arranged as at least one pair or as several pairs of shield blades. In case two pairs of shield blades are used, these can be oriented 90 deg to each other to give, e.g., the possibility to result in a square or in a rectangular shield stop aperture.

In some implementations, the shield stop aperture can be equipped with a filter. A filter described above gives the possibility to filter out undesired wavelengths and/or debris.

In some implementations, the detection system can include a shield stop exchange mount to exchange between different shield stops. The shield stop exchange mount described above can facilitate an exchange between different shield stops. This can be used to replace a worn-out shield stop or to adapt a shield stop aperture size.

In some implementations, the detection system can include a layer of scintillator material arranged at the transfer field. The layer of scintillator material described above enables a good imaging from the transfer field to the detection field.

In some implementations, the detection system can include a pupil stop being arranged in a pupil plane of the imaging optics. The pupil stop described above enables an adaption, in particular of a numerical aperture of the imaging optics, to imaging requirements of the detection system.

This in particular holds for a pupil stop that is movable via a pupil stop decentering drive to translate the pupil stop in the pupil plane. In particular, it has been realized by the inventors, that a stop arranged at a decentering distance with respect to the optical axis of the imaging optics of the imaging optical arrangement makes it possible to adapt such decentering distance to an angle of an oblique or tilted entry of X-rays to the transfer field of the imaging optics. With a respective decentering of the stop opening, a mean spot size of the imaging spots of points of origin from different positions of the layer of scintillator material can be kept advantageously small. This gives a good imaging from the transfer field to the detection field even in case of obliquely entering rays on the layer of scintillator material.

In some implementations, the drive control unit can be in signal connection with the pupil stop decentering drive. The drive control unit described above enables a synchronization of a movement of the shield stop displacement drive, the lateral displacement drive and the pupil stop displacement drive. This enables an automatic measuring process to produce a 3-dimensional image of the object. Data with respect to the dependency between the actions of the shield stop displacement drive, the lateral displacement drive and the pupil stop displacement drive can be gathered from a look-up table. Such look-up table can be produced in a preparational calibration step of the detection system.

In some implementations, the X-ray source can be an open transmissive source or a liquid metal jet source. The X-ray sources described above have proven to be suited for the detection system.

The object mount can be from the type of a ring mount. Such an object mount can have no additional mount material between a used light path and the object. This avoids undesired X-ray absorption.

In some implementations, the object mount can include at least one organic tray or can include an aluminum and/or glass tray, the tray in particular including a dopant to filter a low energy part of a spectrum of the generated X-rays. The object mount described above can minimize an X-ray absorption and/or filter a low, unwanted energy part of the X-ray spectrum.

In another general aspect, an X-ray inspection method is performed using a detection system for X-ray inspection of an object, in which the detection system includes an X-ray source for generating X-rays, and an imaging optical arrangement to image the object in an object plane illuminated by the X-rays, the imaging optical arrangement including an imaging optics to image a transfer field in a field plane into a detection field in a detection plane. The detection system includes a detection array, arranged at the detection field of the imaging optics, and an object mount to hold the object to be imaged via the imaging optics, in which the object mount is movable relative to the light source via an object displacement drive along at least one lateral object displacement direction in the object plane. The detection system includes a shield stop having a shield stop aperture transmissive for the X-rays used to image the object, the shield stop being arranged in an arrangement plane in a light path of the X-rays between the X-ray source and the object mount, the shield stop being movable via a shield stop displacement drive along at least one stop displacement direction in the arrangement plane. The detection system includes a control device having a drive control unit being in signal connection with the shield stop displacement drive and with the object displacement drive for synchronizing a movement of the shield stop displacement drive and the object displacement drive. The shield stop and the detection array are moved synchronously relative to the object to be inspected to realize different object imaging projections. Advantages of the X-ray inspection method described above correspond to those discussed above with respect to the detection system. Synchronous movement of the shield stop, the detection array and the object ensures that a used light path of the X-rays to illuminate the object always (or during substantially most of the operating period of the detection system) impinges on the object at a desired object region to be imaged to result in the desired object imaging projection.

DESCRIPTION OF DRAWINGS

Exemplified embodiments of the invention hereinafter are described with reference to the accompanying figures. In these show:

FIG. 1 partly schematical and partly in a perspective depiction a side-view of a detection system including a detection assembly having an imaging optical arrangement to image an object illuminated by X-rays embodied as a microscope objective shown in a first position of the detection assembly including an object mount relative to an X-ray source of the detection system;

DETAILED DESCRIPTION

Figure 2:
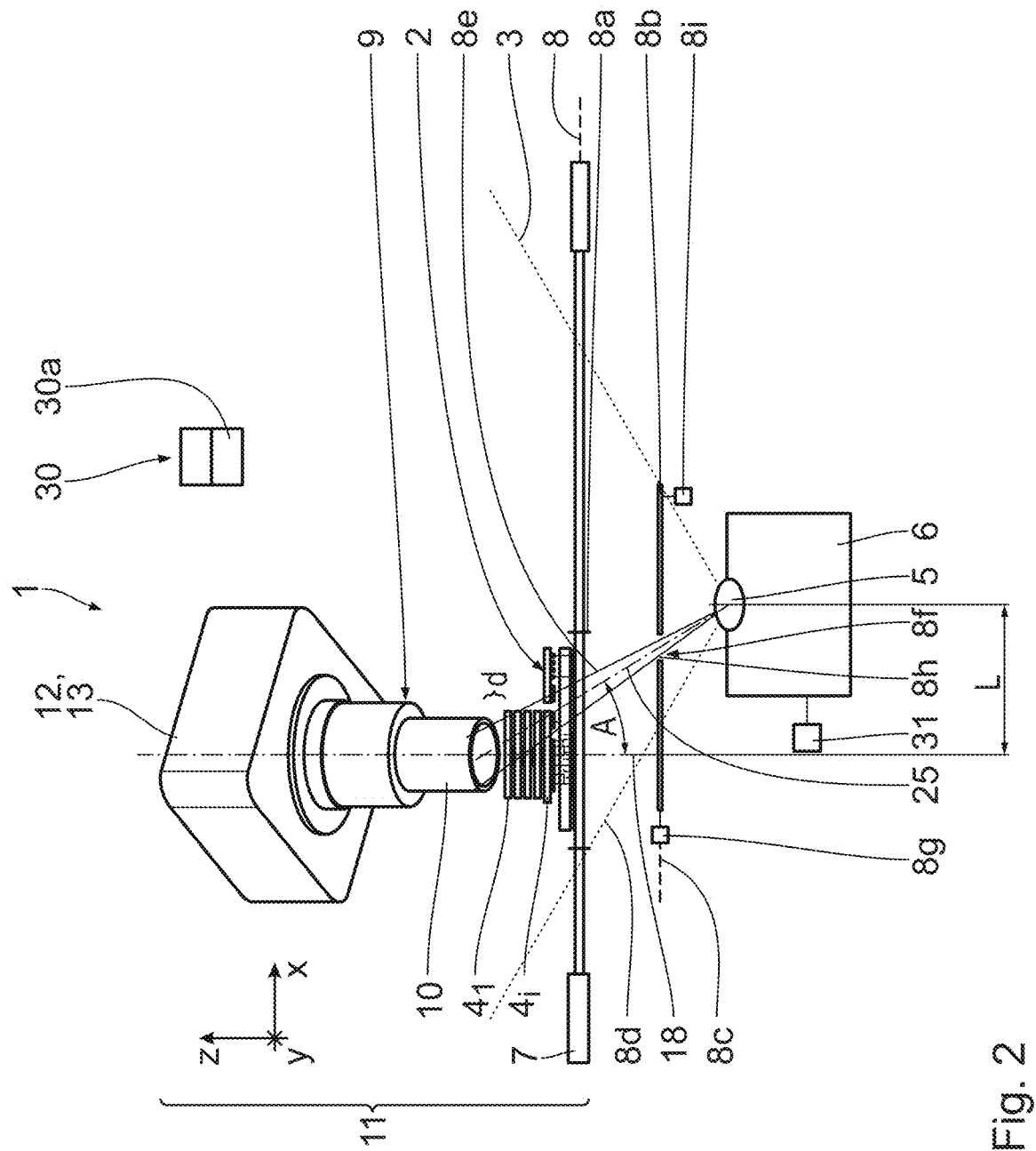
FIG. 2 in a view similar to FIG. 1 the detection system in a further position of the detection assembly including the object mount relative to the X-ray source which compared to FIG. 1 is laterally displaced.

A detection system 1 serves to investigate or inspect an object 2 which is illuminated by X-rays 3. The detection system 1 in particular serves to investigate the quality of packaging, i.e. the quality of mechanical and electrical bonding of electronic components in particular on a chip with micro- and/or nanostructures. Such electronic components often are arranged in a layered, three-dimensional (3D) structure. In FIG. 1 several layers $4_i$ (i=1 . . . 3, 5, 7, 10 or more) are shown.

To facilitate the further description, a Cartesian x-y-z-coordinate system is used hereinafter. In FIG. 1, the x-direction points to the right, the y-direction is perpendicular to the drawing plane and points away from the viewer and the z-direction points upwards.

The layers $4_i$ are stacked in the z-direction.

The X-rays 3 are emitted from a source region 5 of an X-ray source 6. The X-rays 3 are emitted within an emission cone in which the object 2 is arranged. A typical cone angle of such emission cone is in the range between 90 deg and 175 deg and can be 170 deg. A spot size of the source region 5 can be in the range between 1 μm and 100 μm, depending on the type of the X-ray source 6. A continuous power of the X-ray source 6 can be in the range between 1 W and 200 W and can be, again depending on the type of the light source, 20 W or 50 W.

The X-ray source 6 can be from the type of an open transmissive source or of a liquid metal jet source. An example for an open transmissive X-ray source is a source from the product line "TCHE+" offered from X-RAY WorX GmbH, Germany. An example for a liquid metal jet source is the source "metal jet D2+70 kV" offered by Excillum AB.

The object 2 is held by an object mount 7 defining an object plane 8. The object 2 is arranged with respect to the x-y-dimensions within an object field 8a. The object mount 7 is capable to mount objects 2 having a diameter of up to 300 mm or larger.

The object mount 7 can be embodied as a ring mount to have no additional mount material between the used light path 8e and the object 2. Alternatively, the object mount 7 can include a thin organic tray or a multitude of such trays. Such organic tray functions to minimize an absorption of the used X-rays 3. Alternatively, an aluminum and/or glass tray with an appropriate dopant can be used as part of the object mount 7 to filter a low, unwanted energy part of the spectrum of the X-rays 3.

X-ray energies below 10 keV or 15 keV are filtered via a respective object mount side filter. A typical thickness of the organic tray/the aluminum and/or glass tray in a respective embodiment of the object mount 7 can be in the range between 1 mm and 5 mm.

The glass tray can contain appropriate amounts of dopants materials such as Pb, B, As, Bi, Cd, Co, U in particular to optimize the filtering of low energy X-rays.

Between the source region 5 and the object mount 7, a shield stop 8b is arranged in an arrangement plane 8c. The shield stop 8b is arranged in a general light path 8d of the X-rays 3 and serves to select a usable light path 8e within the total light path 8d defined by the emission cone of the light source 6. In particular, the shield stop 8b protects uninspected regions of the object 2 from X-ray exposure. The shield stop 8b has a stop opening 8f, which also is referred to as a shield stop aperture. Through the shield stop aperture 8f, the usable light path 8e propagates which in the further, downward beam path impinges on the object 2.

The shield stop aperture 8f is transmissive for the X-rays 3, which is used to image the object 2. Such shield stop aperture 8f can be circular, can be a square aperture or can be rectangular. Other boundaries contours of the shield stop aperture 8f are possible, e.g. a hexagonal contour.

The shield stop 8b is movable via a shield stop displacement drive 8g along at least one stop displacement direction x/y in the arrangement plane 8c.

Such movement of the shield stop 8b executed via the shield stop displacement drive 8g can be a linear displacement along at least one linear displacement direction, e.g. along x/y. Alternatively and depending on the embodiment of the shield stop displacement drive 8g, the movability of the shield stop 8b can be along two displacement directions, e.g. x and y, spanning up the arrangement plane 8c. In an alternative or additional embodiment of the shield stop displacement drive 8g, the shield stop 8b can be movable along at least one curved direction and in particular can be movable along at least one circular direction.

The shield stop 8b can be configured such that the shield stop aperture 8f is variable in size. In particular, the shield stop 8b can be configured as an iris stop with variable size of the stop opening 8f. Such stop opening size/shape variation can be effected by a respective shield stop aperture drive (not shown).

As shown in the insert FIG. 1A showing a plane xy view of the shield stop 8b, in an embodiment of the shield stop 8b, this can comprise several shield blades 8ba, 8bb, 8bc and 8bd, which together define the shield stop aperture 8f.

In the embodiment shown in FIG. 1A, the blades 8ba to 8bd are arranged in two pairs 8ba, 8bb and 8bc, 8bd of blades which define the extent of the shield stop aperture 8f from opposing sites. Viewed from the direction of FIG. 1A, the blades 8bc, 8bd are arranged below the blades 8ba, 8bb.

A z distance between these blade pairs 8ba, 8bb and 8bc, 8bd can be very small and can be in the range between 1 μm and 100 μm.

As indicated by a dashed line in FIG. 1, the shield stop aperture 8f can be equipped with a filter 8h. Such filter has the function to filter out the low energy part of the x-ray spectrum coming from the source.

The detection system 1 can include a shield stop exchange mount 8i, which is indicated schematically in FIG. 1. Such shield stop exchange mount 8i has the function to exchange between different field stops 8b, in particular to exchange between shield stops 8b with different shield stop apertures 8f and/or to replace a shield stop 8b after its nominal time of use.

The material of the shield stop 8b can be from highly absorptive material, e.g. lead, tungsten alloys. A z thickness of the shield step 8b is in the range between 100 μm and 1 mm.

The object 2 is imaged via an imaging optical arrangement 9 including an imaging optics 10 being embodied as a microscope objective. The imaging optical arrangement 9 is part of a detection assembly 11, which also includes the object mount 7 and a detection array 12 held within a detection housing 13. The detection array 12 can be a CCD or a CMOS array. The detection array 12 can be configured as a flat panel detector. The detection array 12 can have a minimum image read out time according to 10 frames per second (fps). Such image read out time can be smaller to achieve a higher fps value, in particular more than 10 fps, more than 25 fps and more than 50 fps. As a rule, the image read out time is larger than 5 ms.

The detection assembly 11 has a large field of view (FOV). The FOV depends strongly on the magnification of the used microobjective and can span a range from 70 mm for a 0.4× objective down to 0.7 mm for a 40× objective. Of course, the FOV depends on the size of the detection array 12.

The imaging optical arrangement 9 can be arranged such that the imaging optics 10 is exchangeable, in particular to switch between different magnification scales.

During a respective imaging measurement, the detection array 12, the imaging optics 10 and the object mount 7 are arranged in a fixed spatial relationship to each other. This component group 7, 10 and 12 is moved relative to the X-ray source 6 as is described further down below. For imaging/adjustment purposes, the detection array 12, the imaging optics 10 and the object mount 7 can be adjustable to each other in particular in the z-direction.

A typical distance d between the imaging optics 10 and the object 2 is in the range of 1 mm.

A typical minimum distance between the object plane 8, i.e. the arrangement plane of the object mount 7, and the arrangement plane 8c of the shield stop 8b is 1 mm. A typical minimum distance between the source region 5 of the X-ray source 6 and the shield stop 8b is in the range of 1 mm.

The resulting low distance between the source region 5 and the object 2 results in a maximum throughput of the used light path 8e. Further, such minimum distance between the object 2 and the imaging optics 10 results in a maximum resolution of the object imaging.

Further details of the imaging optical arrangement 9 hereinafter also are discussed referring to FIG. 3.

The imaging optics 10 of the imaging optical arrangement 9 serves to image a transfer field 14 in a field plane 15 into a detection field 16 in a detection or image plane 16a. Such imaging can be done according to the respective embodiment of the imaging optics 10 with a magnification of 1 or with a magnification which is larger than 1, e.g. 2, 3, 4, 5, 8, 10, 15, 20, 25, 50, 100 or even larger.

A typical magnification value can be in the range of 4 to 40.

The detector array 12 of the detection assembly 11 is arranged at the detection field 16 of the imaging optics 10. The detection array 12 can be movable with respect to the position of the image plane 16*a* of the imaging optics 10 along the z-direction.

As a rule, the X-rays 3 from the X-ray source 6 produce a projection image on the scintillator material layer 17 via radiographically shading casting. No X-ray optics in such embodiment is present to influence a direction of the X-rays 3 within the usable light path 8*e*.

At the transfer field 14 a layer 17 of scintillator material is arranged. The thickness of such scintillator layer 17 corresponds to the z-extension of the transfer field 14 volume to be imaged by the imaging optics 10. A typical z-extension of the scintillator layer 17, i.e. a typical thickness of such layer 17, is 1 μm to 500 μm and in particular is in the range between 5 μm and 50 μm. The scintillator material layer 17 produces imaging light which can be in the near UV range, in the visible range or in the near infrared region from the X-rays 3 entering the layer 17.

Dependent on the respective embodiment, further X-ray optics can be present to image the object field 8*a* in the object plane 8 into the transfer field 14.

The imaging optics 10 has an optical axis 18 which also is referred to as a reference axis. The optical components of the imaging optics 10 which can be lenses and/or mirrors exhibit with respect to such reference axis 18 at least a certain degree of symmetry and in particular can exhibit rotational symmetry with respect to such reference axis. In the schematical depiction of the imaging optics 10, two of these optical components 18*a*, 18*b* are very schematically indicated.

Figure 3:
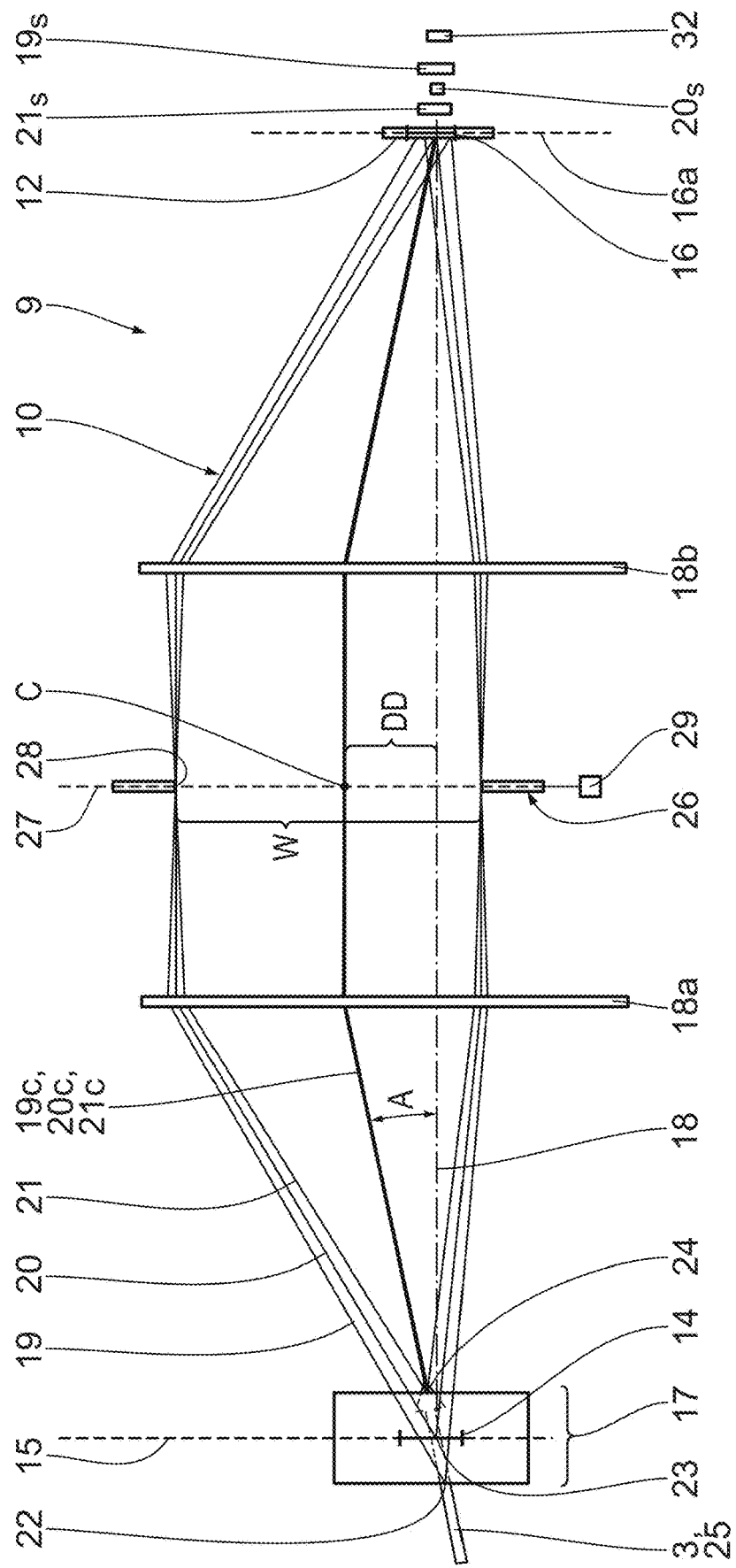
FIG. 3 in a meridional and schematic section the imaging optical arrangement with highlighted rays of an imaging beam path emerging from different points of a scintillator layer along tilted X-rays coming from the object and entering a transfer field to be imaged by the imaging objects of the imaging optical arrangement.

In FIG. 3, an imaging light path between the transfer field 14 and the detection field 16 is indicated by exemplified rays 19, 20, 21 which emerge from three different points of origin 22, 23, 24 from the scintillator layer 17. As exemplified examples of the rays 19, 20, 21 two marginal rays and a chief ray 19*c*, 20*c*, 21*c* are shown. The chief rays or chief imaging rays 19*c*, 20*c*, 21*c* of the imaging light path within the imaging optics 10 are defined as the center rays of the light bundles emanating from the respective points of origin 22, 23, 24 of the scintillator layer 17. Alternatively, such chief imaging rays 19*c*, 20*c*, 21*c* can be defined as those rays which carry the direction of the main imaging light energy.

Point of origin 22 is located at an entrance of an exemplified X-ray 25 from the entering X-rays 3 into the scintillator layer 17. Point of origin 23 is located at the crossing point of the X-ray 25 with the field plane 15, in particular in the middle of the z-extension of the scintillator layer 17. Point of origin 24 is located at the exit of the X-ray 25 from the scintillator layer 17.

In the beam path depicted in FIG. 3, the X-ray 25 enters the transfer field 14 at an angle A to the optical axis 18. Such angle can be in the range between 0 deg and 80 deg. As a result and as a rule, the different points of origin 22 to 24 have different x-coordinates and also, of course, different z-coordinates.

The imaging optics 10 further includes a pupil stop 26 which is arranged in a pupil plane 27 of the imaging optics 10. The pupil stop 26 defines the direction of the marginal rays of the respective ray bundles emerging from the different points of origin from the scintillator layer 17. The chief rays 19*c*, 20*c*, 21*c* run collinearly.

The center C of the stop opening 28 of the pupil stop 26 is arranged at a decentering distance DD with respect to the optical axis 18.

The stop opening 28 defines a pupil of the imaging optics 10. A usable object side numerical aperture (NA) of the imaging optics 10, which is defined by the stop opening 28 of the pupil stop 26, i.e. a usable object side NA, is larger than 0.4. In the embodiment shown, the usable object side NA of the imaging optics 10 can amount to 0.6. The usable object side numerical aperture can be 0.5.

The decentering distance DD is at least 10% of a typical width W, in particular of a diameter of the stop opening 28. Such ratio DD/W can be in the range between 10% and 50%, in particular in the range between 25% and 35%.

The pupil stop 26 is mounted on a decentering drive 29. Such decentering drive 29 serves to translate the pupil stop 26 in the pupil plane 27. Such translation can be done along the x-axis and the y-axis or in any direction in the x-y plane. The decentering drive 29 is in signal connection (not shown) to a control unit 30*a* of a control device 30 of the detection system 1 (compare FIG. 1).

The detection assembly 11 includes a lateral displacement drive 31. Such lateral displacement drive 31 serves for relative lateral displacement in the x- and/or y-direction of the object mount 7 with respect to the X-ray source 6. In the embodiment shown in FIGS. 1 and 2, the lateral displacement drive 31 is connected to the X-ray source 6. In an alternative basic configuration the source 6 remains fixed and only the detection assembly 11 including the object mount 7 holding the object 2 and the shield stop 8*b* move. Thus, depending on the respective embodiment, such lateral displacement drive alternatively or in addition can be connected to a frame holding in particular the object mount 7. Such frame also can hold the imaging optical arrangement 9 and in particular can hold the whole detection assembly 11.

The control unit 30*a* of the control device 30 further is in signal connection (not shown) with the lateral displacement drive 31. Further, the control unit 30*a* of the control device 30 is in signal connection (not shown) with the shield stop displacement drive 8*g*.

FIG. 2 shows the effect of the lateral displacement drive 31. Compared to FIG. 1, the X-ray source 6 is displaced in positive x-direction relative to the detection assembly 11. As mentioned above, such x-displacement can be caused by a lateral displacement drive (not shown) displacing the whole detection assembly 11 and/or by the lateral displacement drive 31 displacing the X-ray source 6. Due to its effect to laterally displace the object mount 7, the lateral displacement drive 31 also is referred to as an object displacement drive. This results in an oblique illumination of the object 2 with the X-rays 25 according to the angle A explained above with respect to FIG. 3. In contrast, in the initial configuration of the X-ray source 6 according to FIG. 1, such X-rays 25 run along the z-direction, i.e. impinge perpendicularly on the object plane 8. By the effect of the lateral displacement drive 31, the object mount 7 is movable relative to the light source 6 along at least one object displacement direction x/y in the object plane 8. Such movability of the object mount 7 via the lateral displacement drive 31 can be along at least one linear displacement direction x and/or y. In an alternative or additional embodiment, the object mount 7 can be movable via the lateral displacement drive 31 or a respective lateral displacement drive acting on the object mount 7 along at least one circular direction relative to the light source 6. Such circular direction in FIG. 1 schematically is represented by an arrow C. As an alternative or an addition a movement is possible along an arbitrary path in two dimensions. Such arbitrary path also can run along a 3D path.

As shown schematically in FIG. 2, in accordance with the lateral movement of the X-ray source 6 relative to the detection assembly 11, the shield stop 8b also is laterally displaced via the shield stop displacement drive 8g to ensure that the used light path 8e of the X-rays 3 impinges on that part of the object to be imaged by the detection system 1. Doing so, the movements of the shield stop displacement drive 8g, of the lateral displacement drive 31 and also of the pupil stop displacement drive 29 are synchronized via the control unit 30a of the control device 30.

The lateral displacement L (compare FIG. 2) of the X-ray source 6 with respect to the object mount 7 and the further components of the detection assembly 11 on the one hand and the decentering distance DD of the center C of the stop opening 28 with respect to the optical axis 18 of the imaging optics 10 on the other are balanced such that the X-rays 25 entering the transfer field 14 run parallel to the chief rays 19c, 20c, 21c.

The control unit 30 serves to control the decentering drive 29 of the pupil stop 26 and the shield stop displacement drive 8g depending on the lateral displacement of the X-ray source 6 effected by the lateral displacement drive 31. Such corresponding drive amount triples of (1) the decentering drive 29, of (2) the shield stop displacement drive 8g and of (3) the lateral displacement drive 31, which result (1) in a balancing of the X-ray 25 direction through the center of the shield stop aperture 8f and (2) in a balancing of the X-ray 25 direction parallel to the chief rays 19c to 21c direction, can be stored in a look-up table of the control device 30.

The detection system 1 is operated as follows:

In the initial configuration according to FIG. 1, the X-rays, which can be in the typical x-ray band and can have energies between 10 keV and 160 keV, produce an object image in the transfer field 14 and are converted by the scintillator layer 17 to a wavelength range in particular in the near UV range, in the visible range or in the near infrared region, which is detectable by the detection array 12. Such converted imaging rays, e.g. the imaging rays 19 to 21, then are imaged via the imaging optics 10 onto the detection array 12 thereby producing an image of the transfer field 14 in the detection field 16 and thereby producing an image of the object 2 on the detection array 12.

By using a method described in DE 10 2018 209 570 A1, different object imaging projections are utilized via the lateral displacement of the X-ray source 6 as explained above. By doing so, a very small distance between the entrance of the imaging optics 10, i.e. the scintillator layer 17 and the nearest layer $4_1$ of the object 2 is ensured in order to minimize transfer errors from the object 2 to the transfer field 14. The minimum distance d (compare FIG. 1) can be in the range of 1 mm. Due to this minimum distance d, when laterally displacing the X-ray source 6 with respect to the detection assembly 11, no tilt of the optical axis 18 with respect to the z-axis is possible to adapt the imaging optics 10 to the oblique illumination by the X-rays 25. This results in the angle A explained above. The use of the decentered pupil stop 26 ensures the image produced in the detection field 16 is not compromised due to such obliquely entering X-rays 25, which produce points of origins of the imaging rays 19 to 21 produced in the scintillator layer 17 along a respectively oblique path (compare points of origin 22 to 24 in FIG. 3). The balancing of the decentering distance DD with the lateral displacement L results in a small mean effective spot size $19_s$, $20_s$, $21_s$ as exemplified shown with the spot images of the points of origin 22 to 24 in FIG. 3. An effective spot size 32 as depicted in FIG. 3 on the right-hand sight as a result is small. Such spot size can be calculated as the distance of the first airy root from the center of the respective airy disc. In particular in the x-dimension, due to the decentered stop opening 28 of the stop 26, the effective spot size 32 can be by a factor 1, 2 to 3 and in particular by a factor in the range between 1.5 and 2.5, in particular in the range around 2 smaller than an uncorrected spot size with a centered stop.

For example, using an object side numerical aperture of 0.4 defined by the stop opening 28 of the stop 26 and further using a wavelength of the imaging rays 19 to 21 of 400 nm, an effective spot size in the x- and in the y-direction can result, which is in the range of 1 μm (FWHM or full width at half maximum). Here, an angle A of the X-rays 25 to the optical axis 18 of 45° was used.

Further, the use of the shield stop 8b ensures that only that X-rays 3 passes the arrangement plane 8c, which is needed to illuminate the object 2 via the used light path 8e. This avoids unnecessary X-ray load on the object 2 and also on the components of the detection assembly 11.

A nominal object side numerical aperture (NA) of the imaging optics 10, which might be usable without constriction of the decentered pupil stop 26, is larger than the object side numerical aperture as defined by the stop opening 28. For example, in case of a width W of the stop opening 28 resulting in a usable object side numerical aperture of 0.6 and further in case of the angle A amounting to 20 deg, such nominal object side numerical aperture of the imaging optics 10 is (sin 20 deg=0.34) 0.6+0.34, i.e. is 0.94.

Larger nominal object side numerical apertures are possible by using immersion imaging optics 10. Examples and references for such further imaging optics are given in U.S. Pat. No. 7,057,187, the entire content of which is incorporated by reference. For example, the nominal object side numerical aperture of the imaging optics 10 can be up to 1.9.

U.S. Pat. No. 7,057,187 further gives examples for scintillating materials which can be used for the scintillating layer 17. A preferred material is CsI, having a refractive index of 1.95. Other scintillating material having refractive indices between 1.50 and 2.20 also can be used.

Possible scintillator materials for the scintillating layer 17 are NaI:Tl, CsI:Tl, CsI:Na, CsI, $BaF_2$, $CeF_3$, BGO, PWO:Y, LSO/LYSO or perovskites such as $CsPbBr_3$ and $CsPbI_3$.

While this specification contains many implementation details, these should not be construed as limitations on the scope of the invention or of what can be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. The separation of various system components in the embodiments described above should not be understood as requiring such separation in all embodiments. Moreover, although features can be described above as acting in certain combinations and even initially claimed as such, one or more features from a claimed combination can in some cases be excised from the combination, and the claimed combination can be directed to a subcombination or variation of a subcombination.

Thus, particular embodiments of the invention have been described. Other embodiments are within the scope of the following claims. In addition, the actions recited in the claims can be performed in a different order and still achieve desirable results.

What is claimed is:

1. A detection system for an X-ray inspection of an object, the detection system comprising:
an X-ray source for generating X-rays,
an imaging optical arrangement to image the object in an object plane illuminated by the X-rays, the imaging optical arrangement comprising an imaging optics to image a transfer field in a field plane into a detection field in a detection plane,
a detection array, arranged at the detection field of the imaging optics,
an object displacement drive,
an object mount to hold the object to be imaged via the imaging optics, wherein the object mount is movable relative to the X-ray source via the object displacement drive along at least one lateral object displacement direction in the object plane,
a shield stop displacement drive,
a shield stop having a shield stop aperture transmissive for the X-rays used to image the object, the shield stop being arranged in an arrangement plane in an X-Ray path of the X-rays between the X-ray source and the object mount, the shield stop being movable via the shield stop displacement drive along at least one stop displacement direction in the arrangement plane, and
a control device having a drive control unit being in a signal connection with the shield stop displacement drive and with the object displacement drive for synchronizing a movement of the shield stop displacement drive and a movement of the object displacement drive.

2. The detection system of claim 1, wherein the object mount is movable along at least one linear displacement direction.

3. The detection system of claim 1, wherein the shield stop is movable along at least one linear displacement direction.

4. The detection system of claim 1, wherein the object mount and/or the shield stop is movable along at least one circular direction.

5. The detection system of claim 1, wherein the shield stop is configured such that the shield stop aperture is variable in size.

6. The detection system of claim 1, wherein the shield stop comprises several shield blades.

7. The detection system of claim 1, wherein the shield stop aperture comprises a filter.

8. The detection system of claim 1, further comprising a shield stop exchange mount to exchange between different shield stops.

9. The detection system of claim 1, further comprising a layer of scintillator material arranged at the transfer field.

10. The detection system of claim 1, further comprising a pupil stop being arranged in a pupil plane of the imaging optics.

11. The detection system of claim 10, further comprising a pupil stop decentering drive, wherein the pupil stop is movable via the pupil stop decentering drive to translate the pupil stop in the pupil plane.

12. The detection system of claim 11, wherein the drive control unit is in a signal connection with the pupil stop decentering drive.

13. The detection system of claim 11, wherein the control device has a lookup table configured to store data with respect to a dependency between actions of the shield stop displacement drive, actions of the object displacement drive, and actions of the pupil stop decentering drive.

14. The detection system of claim 13, wherein the drive control unit is configured to use the data stored in the lookup table to synchronize a movement of the shield stop displacement drive, a movement of the object displacement drive, and a movement of the pupil stop decentering drive.

15. The detection system of claim 1, wherein the X-ray source is an open transmissive source or a liquid metal jet source.

16. The detection system of claim 1, wherein the object mount includes at least one organic tray or includes an aluminum and/or glass tray.

17. The detection system of claim 16, wherein the at least one organic tray or the aluminum tray or the glass tray comprises a dopant to filter a low energy part of a spectrum of the generated X-rays.

18. The detection system of claim 1, further comprising a lookup table that stores data with respect to a dependency between actions of the shield stop displacement drive and actions of the object displacement drive,
wherein the control device is configured to use the data stored in the lookup table to synchronize a movement of the shield stop displacement drive and a movement of the object displacement drive.

19. The detection system of claim 1, wherein the control device has a lookup table configured to store data with respect to a dependency between actions of the shield stop displacement drive and actions of the object displacement drive.

20. The detection system of claim 19, wherein the drive control unit is configured to use the data stored in the lookup table to synchronize a movement of the shield stop displacement drive and a movement of the object displacement drive.

21. The detection system of claim 19, wherein the lookup table is configured to include data produced in a preparational calibration step of the detection system.

22. An X-ray inspection method using a detection system of claim 1, comprising moving the shield stop and the detection array synchronously relative to the object to be inspected to realize different object imaging projections.

23. The X-ray inspection method of claim 22, further comprising moving the object mount along at least one linear displacement direction.

24. The X-ray inspection method of claim 22, further comprising moving the shield stop along at least one linear displacement direction.

25. The X-ray inspection method of claim 22, further comprising moving the object mount and/or the shield stop along at least one circular direction.

26. The X-ray inspection method of claim 22, further comprising:
reading data from a look-up table that stores data with respect to a dependency between actions of the shield stop displacement drive and actions of the object displacement drive, and
using the data from the lookup table to synchronizing a movement of the shield stop displacement drive and a movement of the object displacement drive.

* * * * *

UNITED STATES PATENT AND TRADEMARK OFFICE
CERTIFICATE OF CORRECTION

PATENT NO. : 11,817,231 B2
APPLICATION NO. : 17/402822
DATED : November 14, 2023
INVENTOR(S) : Johannes Ruoff et al.

It is certified that error appears in the above-identified patent and that said Letters Patent is hereby corrected as shown below:

In the Specification

Column 1
Line 28, delete "X-Ray" and insert -- X-ray --

Column 2
Line 12, delete "keV" and insert -- keV. --

In the Claims

Column 11
Line 24, in Claim 1, delete "X-Ray" and insert -- X-ray --

Signed and Sealed this
Ninth Day of April, 2024

Katherine Kelly Vidal
*Director of the United States Patent and Trademark Office*